United States Patent
Lehmann et al.

(10) Patent No.: US 9,731,564 B2
(45) Date of Patent: Aug. 15, 2017

(54) METHOD FOR ASSOCIATING TIRE POSITIONS ON A VEHICLE HAVING A TIRE PRESSURE MONITORING SYSTEM

(71) Applicant: Continental Reifen Deutschland GmbH, Hannover (DE)

(72) Inventors: Joerg Lehmann, Hannover (DE); Adrian Cyllik, Hannover (DE); Joerg Hanna, Roedinghausen (DE); Siva Sankar Surisetti, Hannover (DE); Andreas Scher, Burgdorf (DE)

(73) Assignee: Continental Reifen Deutchland GmbH, Hannover (DE)

( * ) Notice: Subject to any disclaimer, the term of this patent is extended or adjusted under 35 U.S.C. 154(b) by 62 days.

(21) Appl. No.: 14/830,550

(22) Filed: Aug. 19, 2015

(65) Prior Publication Data
US 2015/0352912 A1    Dec. 10, 2015

Related U.S. Application Data

(63) Continuation of application No. PCT/EP2013/077270, filed on Dec. 19, 2013.

(30) Foreign Application Priority Data

Feb. 19, 2013  (DE) .................. 10 2013 101 619

(51) Int. Cl.
*B60C 23/00*   (2006.01)
*B60C 23/04*   (2006.01)

(52) U.S. Cl.
CPC ...... *B60C 23/0489* (2013.01); *B60C 23/0472* (2013.01); *B60C 23/0479* (2013.01)

(58) Field of Classification Search
CPC ............ B60C 23/0489; B60C 23/0472; B60C 23/0479
(Continued)

(56) References Cited

U.S. PATENT DOCUMENTS 6,243,007 B1 *  6/2001  McLaughlin ....... B60C 23/0416
                                                     340/442
7,250,852 B1 *  7/2007  Kell ................... B60C 23/0408
                                                     340/10.1
(Continued)

FOREIGN PATENT DOCUMENTS

TW           200929085 A      7/2009

OTHER PUBLICATIONS

International Search Report dated Mar. 18, 2014 of international application PCT/EP2013/077270 on which this application is based.
(Continued)

*Primary Examiner* — Eric M Blount
(74) *Attorney, Agent, or Firm* — Walter Ottesen, P.A.

(57) ABSTRACT

A method via which tire modules can be associated with tire positions on a vehicle includes: inputting vehicle data and tire information via a mobile detecting device; analyzing the input information via the detecting device; providing an instruction to the user of the detecting device indicating the first tire for performing a first tire module identification; positioning the detecting device near the first tire which is specified by the detecting device; activating an inquiry signal having a transmission frequency specified by the detecting device and a specified signal amplitude to a tire module arranged in the tire, wherein the tire module includes at least one sensor for tire-pressure monitoring; capturing a response signal from the tire module, wherein the response includes the identification data of the tire module; and, evaluating the response signal of the tire module and associating the identified tire module with a tire position.

13 Claims, 3 Drawing Sheets

(58) Field of Classification Search
USPC .......................................................... 340/442
See application file for complete search history.

(56) References Cited

U.S. PATENT DOCUMENTS

| | | | |
|---|---|---|---|
| 8,736,435 B2* | 5/2014 | Kanenari | B60C 23/0471 340/425.5 |
| 9,024,743 B2* | 5/2015 | Deniau | B60C 23/044 340/442 |
| 9,122,423 B2* | 9/2015 | McIntyre | B60C 23/0471 |
| 2002/0130771 A1 | 9/2002 | Osborne et al. | |
| 2004/0094251 A1 | 5/2004 | Strache et al. | |
| 2007/0018804 A1 | 1/2007 | Strache et al. | |
| 2008/0001729 A1 | 1/2008 | Kyllmann et al. | |
| 2008/0100430 A1* | 5/2008 | Kochie | B60C 23/0408 340/447 |
| 2008/0164988 A1 | 7/2008 | DeKeuster et al. | |
| 2013/0106596 A1* | 5/2013 | Mouchet | B60C 23/02 340/445 |

OTHER PUBLICATIONS

ATEQ-15 et al, "ATEQ VT 55 User Manual", Internet Citation, Nov. 2009, pp. 1 to 38, XP002690038, http://www.orange-electronic.com/en/products/oe_sensor/VT55d-U0S.pdf.

* cited by examiner

METHOD FOR ASSOCIATING TIRE POSITIONS ON A VEHICLE HAVING A TIRE PRESSURE MONITORING SYSTEM

CROSS REFERENCE TO RELATED APPLICATIONS

This application is a continuation application of international patent application PCT/EP2013/0077270, filed Dec. 19, 2013, designating the United States and claiming priority from German application 10 2013 101 619.7, filed Feb. 19, 2013, and the entire content of both applications is incorporated herein by reference.

FIELD OF THE INVENTION

The invention relates to a method for associating tire positions on a vehicle having a tire pressure monitoring system.

BACKGROUND OF THE INVENTION

Tire modules, which are provided with transponders, are used in the tire, in particular in the case of tire sensors for truck tires, for various tasks. These tasks include in particular tire identification with which a motor vehicle manufacturer can detect quickly and in an automated fashion, inter alia, from which tire factory a specific tire was supplied and on which vehicle the tire has been mounted. Other tasks are generally air pressure monitoring, temperature measurement or the measurement of mechanical stress states in the tire. Modern transponders are composed of an electronic component or chip in which sensor elements can be arranged as well as of an antenna which is connected to this electronic component. An example of such a transponder is disclosed by United States patent application publications 2004/0094251 and 2007/0018804.

A problem, when monitoring the tire pressure of utility vehicles, is that every vehicle tire is provided with a tire module for pressure monitoring and every tire module has to be associated to a tire position on the vehicle.

SUMMARY OF THE INVENTION

It is an object of the invention to provide a method with which each tire module can be associated with the correct tire position on the vehicle easily and with a high level of accuracy.

The object is achieved by a method having the following steps:
a) inputting vehicle data and vehicle tire information with a mobile detecting device,
b) analyzing the input information with the mobile detecting device,
c) providing an instruction to the user of the mobile detecting device,
  wherein the instruction indicates to the user the first vehicle tire for the execution of a first tire module identification,
d) positioning the mobile detecting device in the vicinity of the first vehicle tire, which vehicle tire is predefined by the detecting device,
e) activating an interrogation signal with a transmission frequency specified by the detecting device and with a specified signal amplitude to a tire module which is arranged in the vehicle tire,
  wherein the tire module comprises at least one sensor for tire pressure monitoring,
f) detecting a response signal from the tire module, wherein the response signal comprises at least the identification data of the tire module,
g) evaluating the response signal of the tire module and associating the identified tire module with a tire position on the vehicle,
h) storing the association of the identified tire module in a memory of the detecting device,
i) displaying a further instruction to the user of the mobile detecting device,
  wherein the instruction indicates to the user the next vehicle tire for the execution of a next tire module identification,
j) positioning the mobile detecting device in the vicinity of the next vehicle tire for the execution of a next tire module identification,
k) repetition of the steps e) to j) until all the tire modules have been identified and respectively associated with a tire position on the vehicle,
l) transmitting the data detected and evaluated with the mobile detecting device to a central unit of the tire pressure monitoring system on the vehicle,
  wherein the tire pressure monitoring system associates in each case a tire module identification to each tire position on the vehicle,
  as a result of which in the event of a tire pressure warning message the respective tire position on the vehicle can be indicated to the driver.

An advantage of the invention is, in particular, that via the method according to the invention simple and reliable association of the tire modules with the individual tire positions on the vehicle takes place. The user of the detecting device merely has to follow the instructions on the display of the detecting device. The correct evaluation of the response signals of the tire modules and the unambiguous association thereof take place in an automated fashion via the detecting device.

In one advantageous embodiment, there is provision that in step e), in the case of vehicle tires arranged directly one behind the other and/or dual tires for utility vehicles the mobile detecting device sets the signal amplitude of the interrogation signal in such a way that a correct association of the respective tire module is made to the corresponding vehicle tire.

Owing to the spatial proximity, with these vehicle tires incorrect measurements may occur which can be avoided via the intelligent detection strategy.

In a further advantageous embodiment, there is provision that in step e) the mobile detecting device displays on a display the detecting movement of the detecting device which is to be carried out at the vehicle tire, wherein with the detecting movement a starting position on the vehicle tire, a direction of movement and a rotational speed for the detecting device are displayed on the display.

As a result, incorrect measurements owing to a tire module which is arranged in an adjacent vehicle tire are very largely prevented.

In a further advantageous embodiment, there is provision that the starting position in the case of the first rear vehicle tire, with respect to an analogue time display, is at approximately 11 o'clock, and the direction of movement of the detecting device is indicated in the clockwise direction.

As a result, incorrect detection owing to a tire module, which is arranged in an adjacent vehicle tire, is very largely prevented.

In a further advantageous embodiment, there is provision that the starting position in the case of subsequent vehicle tires, as a function of the tire position on the vehicle and with respect to an analogue time display, is at approximately 2 o'clock and the direction of movement of the detecting device is indicated counter to the clockwise direction.

As a result, incorrect detection owing to a tire module, which is arranged in an adjacent vehicle tire, is very largely prevented.

In a further advantageous embodiment, there is provision that in step e) in the case of a dual tire on the outside of the vehicle the mobile detecting device starts with a low signal amplitude of the interrogation signal and the signal amplitude is subsequently increased in three steps until the tire module which is arranged in the dual tire on the outside of the vehicle responds and a tire module identification has taken place.

In this way, it is ensured that firstly only the dual tire on the outside of the vehicle reacts with a response signal.

In a further advantageous embodiment, there is provision that in step e) in the case of a dual tire on the inside of the vehicle the mobile detecting device starts with a relatively high signal amplitude of the interrogation signal and the signal amplitude is subsequently increased in three steps until the tire module, which is arranged in the dual tire on the inside of the vehicle, responds and a tire module identification has taken place.

In this way, it is ensured that in the case of the dual tires on the inside of the vehicle the magnitude of the signal amplitude is sufficient to reach the tire module in the dual tire on the inside of the vehicle.

In a further advantageous embodiment, there is provision that in the case of multiple dual tires, all the tire modules of the tires on the outside of the vehicle on one vehicle side are firstly identified and associated, wherein subsequently the tire modules of the tires on the inside of the vehicle on the same vehicle side are identified and associated.

In this way, the user has to cover short paths with the detecting device.

In a further advantageous embodiment, there is provision that in step f) the tire modules which have already been sensed and identified are ignored by the detecting device if further response signals are received from these tire modules by the detecting device.

As a result, incorrect associations of tire modules are easily avoided.

In a further advantageous embodiment, there is provision that in step g) double checking of the response signals takes place, wherein the identification data of the tire module are not accepted by the detecting device as being correct until the same identification data are received at least twice in succession in a short time interval by the detecting device.

As a result, incorrect associations of tire modules are effectively avoided.

In a further advantageous embodiment, there is provision that in step g) checking takes place as to whether the received data telegram is a response signal and not a periodically output signal of the tire module.

As a result, incorrect associations of tire modules are effectively avoided.

In a further advantageous embodiment, there is provision that in step g) checking takes place as to whether the tire module is in a deactivated state, wherein subsequently in the case of identification of deactivation the tire module is automatically placed in an active state.

As a result, the learning process for detecting the tire modules does not have to be interrupted.

In a further advantageous embodiment, there is provision that the detecting mode of the detecting device is interrupted if in the case of at least two measurements two response telegrams are received in direct succession from different tire modules and no unambiguous tire position association can take place.

With the configuration in this case, two tire modules could be located in the direct vicinity of one another.

In a further advantageous embodiment, there is provision that the user is instructed to drive the vehicle approximately one meter further and to repeat the measurement with the detecting device on the last vehicle tire, if no unambiguous tire position association can take place despite repeated measurement with the detecting device.

As a result of the further movement of the vehicle by approximately one meter, the tire modules are also moved spatially apart from one another. Subsequent measurement would then have to give rise to an unambiguous tire module association.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
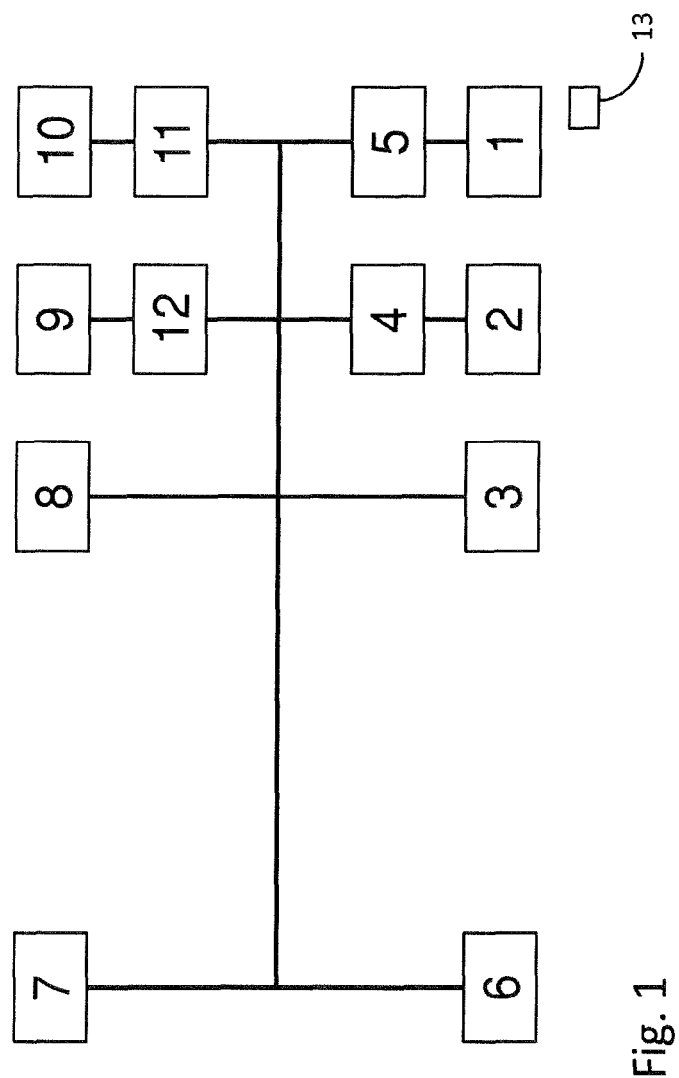
FIG. 1 is a plan view of a tire arrangement for a traction machine.

FIG. 1 is a schematic plan view of a tire arrangement for a traction machine with 12 vehicle tires, wherein a tire module has been mounted in each vehicle tire in the tire cavity. The tire module is mounted on the inside of the tire opposite the tread, generally via a bonded connection. Firstly, the most important vehicle parameters such as, for example, the number of axles, tires per axle, setpoint pressures, warning values et cetera, are input via a keypad on the detecting device 13.

Subsequently, via the display of the detecting device, the vehicle is displayed with the tire positions in a plan view and the user is instructed to go, for example, to the first vehicle tire 1 in order to identify the first tire module in the first vehicle tire 1 there.

After the tire module in the first vehicle tire 1 has been detected the user is requested to continue the process in the displayed sequence on the vehicle tires 2 to 12. The learning process is concluded when all the tire modules in the individual vehicle tires 1 to 12 have been identified and associated with a tire position. Subsequently, the data are transmitted to a central unit of the tire pressure monitoring system in the vehicle. In the case of a tire pressure warning message, it can be indicated directly to the driver which of the vehicle tires has a minimum pressure.

Figure 2:
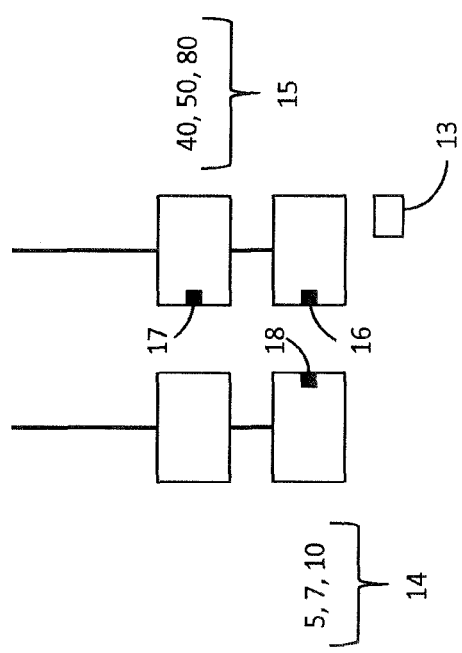
FIG. 2 is a plan view of the rear part of the tire arrangement.

FIG. 2 shows a plan view of the rear part of the tire arrangement in FIG. 1. The detecting device 13 firstly transmits at a low signal amplitude in the low frequency range, in the illustrated value range 14, in order to identify the tire module 16 in the first vehicle tire 1. The value range 14 is increased in three steps with the signal values of approximately 5, 7 and 10, until it has been possible to identify the tire module 16 unambiguously. The signal values are oriented to a value range of at minimum 0 to at maximum 180, which can be set on the detecting device.

The detecting device 13 later transmits with a relatively high signal amplitude, in the illustrated value range 15, in order to identify the tire module 17 in the fifth vehicle tire 5. The value range 15 is increased in three steps with the signal values of approximately 40, 50 and 80 until it has been possible to identify the tire module 17 unambiguously. The relatively high signal values are necessary, in particular, owing to the relatively large distance to the detecting device.

Figure 3:
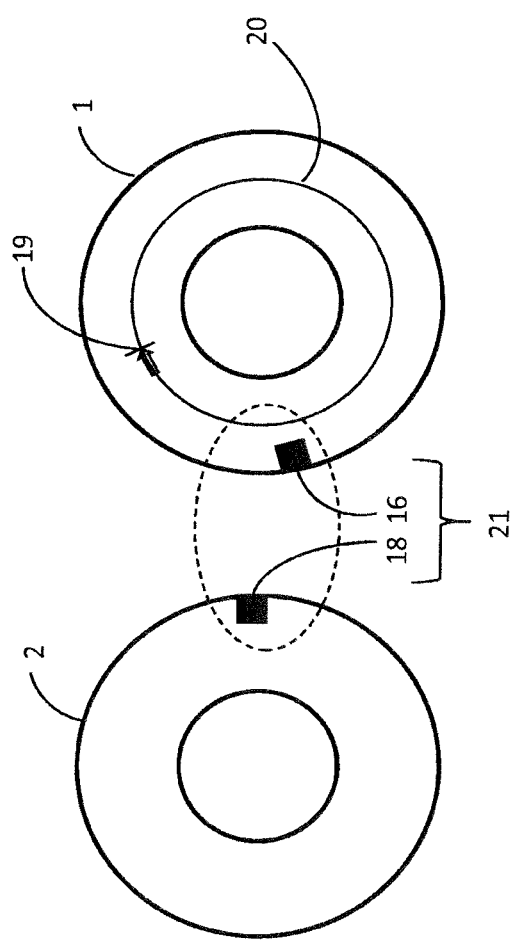
FIG. 3 is a side view of vehicle tires 1 and 2.

FIG. 3 shows the vehicle tires 1 and 2 in a side view. It is shown how the detecting device is to be moved past the side wall. The starting position 19 represents the starting position for the detecting device on the vehicle tire. In the case of the vehicle tire 1, this starting position is located at approximately 11 o'clock with respect to an analogue time display. Subsequently, the detecting device is to be moved past the side wall in the rotational direction 20 at a specified speed in order to be able to identify the tire module 16. The signal amplitude is increased in steps in three stages along the side wall after each revolution of the detecting device, until it has been possible to identify the tire module 16. Generally, a maximum of 3 revolutions are provided with the detecting device.

The range 21 represents the critical measuring range, since the tire module 18 is located lying opposite in this range in the vehicle tire 2. The tire module 18 could give rise to an incorrect association owing to its spatial proximity.

It is understood that the foregoing description is that of the preferred embodiments of the invention and that various changes and modifications may be made thereto without departing from the spirit and scope of the invention as defined in the appended claims.

LIST OF REFERENCE NUMBERS

1 First, rearmost vehicle tire on the outside of the vehicle, with a first tire module arranged in the tire cavity
2 Second vehicle tire on the outside of the vehicle, with a tire module
3 Third vehicle tire on the outside of the vehicle, with a tire module,
4 Fourth vehicle tire on the inside of the vehicle, with a tire module
5 Fifth vehicle tire on the inside of the vehicle, with a tire module
6 Sixth vehicle tire on the outside of the vehicle, with a tire module
7-12 Vehicle tires with tire modules on the opposite side of the vehicle
13 Mobile detecting device
14 Value for signal amplitudes for detecting the tire module in the first tire on the outside of the vehicle
15 Values for signal amplitudes for detecting the tire module in the fifth tire on the inside of the vehicle
16 Tire module in the first vehicle tire
17 Tire module in the fifth vehicle tire
18 Tire module in the second vehicle tire
19 Starting position for detecting device (at approximately 11 o'clock with respect to an analogue time display)
20 Rotational direction for the detecting device
21 Critical measuring range for the detecting device

What is claimed is:

1. A method for associating tire positions on a vehicle having a tire pressure monitoring system, the method comprising the steps of:
    a) inputting vehicle data and vehicle tire information with a mobile detecting device;
    b) analyzing the inputted information with the mobile detecting device;
    c) providing an instruction to a user of the mobile detecting device, wherein the instruction indicates to the user a first vehicle tire for the execution of a first tire module identification;
    d) positioning the mobile detecting device in the vicinity of the first vehicle tire, the vehicle tire being predefined by the mobile detecting device;
    e) activating an interrogation signal with a transmission frequency specified by the mobile detecting device and with a specified signal amplitude to a tire module arranged in the vehicle tire, the tire module having at least one sensor configured to monitor the tire pressure;
    f) detecting a response signal from the tire module, wherein the response signal includes at least the identification data of the tire module;
    q) evaluating the response signal of the tire module and associating the identified tire module with a tire position on the vehicle;
    h) storing the association of the identified tire module in a memory of the mobile detecting device;
    i) displaying a further instruction to the user of the mobile detecting device, wherein the further instruction indicates to the user the next vehicle tire for the execution of a next tire module identification;
    j) positioning the mobile detecting device in the vicinity of the next vehicle tire for the execution of a next tire module identification;
    k) repetition of the steps e) to j) until all the tire modules have been identified and respectively associated with a tire position on the vehicle;
    l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and,
    wherein in step e), the mobile detecting device displays on a display a detecting movement of the detecting device which is to be carried out at the vehicle tire, wherein with the detecting movement a starting position on the vehicle tire, a direction of movement and a rotational speed for the detecting device are displayed on the display.

2. The method of claim 1, wherein in step e), in the case of vehicle tires arranged directly one behind the other and/or dual tires for utility vehicles, the mobile detecting device sets the signal amplitude of the interrogation signal in such a way that a correct association of the respective tire module is made to the corresponding vehicle tire.

3. A method for associating tire positions on a vehicle having a tire pressure monitoring system, the method comprising the steps of:
    a) inputting vehicle data and vehicle tire information with a mobile detecting device;
    b) analyzing the inputted information with the mobile detecting device;
    c) providing an instruction to a user of the mobile detecting device, wherein the instruction indicates to the user a first vehicle tire for the execution of a first tire module identification;
    d) positioning the mobile detecting device in the vicinity of the first vehicle tire, the vehicle tire being predefined by the mobile detecting device;

e) activating an interrogation signal with a transmission frequency specified by the mobile detecting device and with a specified signal amplitude to a tire module arranged in the vehicle tire, the tire module having at least one sensor configured to monitor the tire pressure;

f) detecting a response signal from the tire module, wherein the response signal includes at least the identification data of the tire module;

g) evaluating the response signal of the tire module and associating the identified tire module with a tire position on the vehicle;

h) storing the association of the identified tire module in a memory of the mobile detecting device;

i) displaying a further instruction to the user of the mobile detecting device, wherein the further instruction indicates to the user the next vehicle tire for the execution of a next tire module identification;

j) positioning the mobile detecting device in the vicinity of the next vehicle tire for the execution of a next tire module identification;

k) repetition of the steps e) to j) until all the tire modules have been identified and respectively associated with a tire position on the vehicle;

l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and, wherein a starting position in the case of a first rear vehicle tire, with respect to an analogue time display, is at approximately 11 o'clock, and the direction of movement of the mobile detecting device is indicated in the clockwise direction.

4. A method for associating tire positions on a vehicle having a tire pressure monitoring system, the method comprising the steps of:

a) inputting vehicle data and vehicle tire information with a mobile detecting device;

b) analyzing the inputted information with the mobile detecting device;

c) providing an instruction to a user of the mobile detecting device, wherein the instruction indicates to the user a first vehicle tire for the execution of a first tire module identification;

d) positioning the mobile detecting device in the vicinity of the first vehicle tire, the vehicle tire being predefined by the mobile detecting device;

e) activating an interrogation signal with a transmission frequency specified by the mobile detecting device and with a specified signal amplitude to a tire module arranged in the vehicle tire, the tire module having at least one sensor configured to monitor the tire pressure;

f) detecting a response signal from the tire module, wherein the response signal includes at least the identification data of the tire module;

g) evaluating the response signal of the tire module and associating the identified tire module with a tire position on the vehicle;

h) storing the association of the identified tire module in a memory of the mobile detecting device;

i) displaying a further instruction to the user of the mobile detecting device, wherein the further instruction indicates to the user the next vehicle tire for the execution of a next tire module identification;

j) positioning the mobile detecting device in the vicinity of the next vehicle tire for the execution of a next tire module identification;

k) repetition of the steps e) to j) until all the tire modules have been identified and respectively associated with a tire position on the vehicle;

l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and, wherein a starting position in the case of subsequent vehicle tires, as a function of the tire position on the vehicle and with respect to an analogue time display, is at approximately 2 o'clock and the direction of movement of the mobile detecting device is indicated counter to the clockwise direction.

5. A method for associating tire positions on a vehicle having a tire pressure monitoring system, the method comprising the steps of:

a) inputting vehicle data and vehicle tire information with a mobile detecting device;

b) analyzing the inputted information with the mobile detecting device;

c) providing an instruction to a user of the mobile detecting device, wherein the instruction indicates to the user a first vehicle tire for the execution of a first tire module identification;

d) positioning the mobile detecting device in the vicinity of the first vehicle tire, the vehicle tire being predefined by the mobile detecting device;

e) activating an interrogation signal with a transmission frequency specified by the mobile detecting device and with a specified signal amplitude to a tire module arranged in the vehicle tire, the tire module having at least one sensor configured to monitor the tire pressure;

f) detecting a response signal from the tire module, wherein the response signal includes at least the identification data of the tire module;

g) evaluating the response signal of the tire module and associating the identified tire module with a tire position on the vehicle;

h) storing the association of the identified tire module in a memory of the mobile detecting device;

i) displaying a further instruction to the user of the mobile detecting device, wherein the further instruction indicates to the user the next vehicle tire for the execution of a next tire module identification;

j) positioning the mobile detecting device in the vicinity of the next vehicle tire for the execution of a next tire module identification;

k) repetition of the steps e) to j) until all the tire modules have been identified and respectively associated with a tire position on the vehicle;

l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and, wherein in step e), in the case of a dual tire on the outside of the vehicle, the mobile detecting device starts with a low signal amplitude of the interrogation signal and the signal amplitude is subsequently increased in three steps until the tire module which is arranged in the dual tire on the outside of the vehicle responds and the tire module identification has taken place.

6. A method for associating tire positions on a vehicle having a tire pressure monitoring system, the method comprising the steps of:
   a) inputting vehicle data and vehicle tire information with a mobile detecting device;
   b) analyzing the inputted information with the mobile detecting device;
   c) providing an instruction to a user of the mobile detecting device, wherein the instruction indicates to the user a first vehicle tire for the execution of a first tire module identification;
   d) positioning the mobile detecting device in the vicinity of the first vehicle tire, the vehicle tire being predefined by the mobile detecting device;
   e) activating an interrogation signal with a transmission frequency specified by the mobile detecting device and with a specified signal amplitude to a tire module arranged in the vehicle tire, the tire module having at least one sensor configured to monitor the tire pressure;
   f) detecting a response signal from the tire module, wherein the response signal includes at least the identification data of the tire module;
   g) evaluating the response signal of the tire module and associating the identified tire module with a tire position on the vehicle;
   h) storing the association of the identified tire module in a memory of the mobile detecting device;
   i) displaying a further instruction to the user of the mobile detecting device, wherein the further instruction indicates to the user the next vehicle tire for the execution of a next tire module identification;
   j) positioning the mobile detecting device in the vicinity of the next vehicle tire for the execution of a next tire module identification;
   k) repetition of the steps e) to j) until all the tire modules have been identified and respectively associated with a tire position on the vehicle;
   l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and,
   wherein in step e), in the case of a dual tire on the inside of the vehicle, the mobile detecting device starts with a relatively high signal amplitude of the interrogation signal and the signal amplitude is subsequently increased in three steps until the tire module which is arranged in the dual tire on the inside of the vehicle responds and a tire module identification has taken place.

7. A method for associating tire positions on a vehicle having a tire pressure monitoring system, the method comprising the steps of:
   a) inputting vehicle data and vehicle tire information with a mobile detecting device;
   b) analyzing the inputted information with the mobile detecting device;
   c) providing an instruction to a user of the mobile detecting device, wherein the instruction indicates to the user a first vehicle tire for the execution of a first tire module identification;
   d) positioning the mobile detecting device in the vicinity of the first vehicle tire, the vehicle tire being predefined by the mobile detecting device;
   e) activating an interrogation signal with a transmission frequency specified by the mobile detecting device and with a specified signal amplitude to a tire module arranged in the vehicle tire, the tire module having at least one sensor configured to monitor the tire pressure;
   f) detecting a response signal from the tire module, wherein the response signal includes at least the identification data of the tire module;
   g) evaluating the response signal of the tire module and associating the identified tire module with a tire position on the vehicle;
   h) storing the association of the identified tire module in a memory of the mobile detecting device;
   i) displaying a further instruction to the user of the mobile detecting device, wherein the further instruction indicates to the user the next vehicle tire for the execution of a next tire module identification;
   j) positioning the mobile detecting device in the vicinity of the next vehicle tire for the execution of a next tire module identification;
   k) repetition of the steps e) to j) until all the tire modules have been identified and respectively associated with a tire position on the vehicle;
   l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and,
   wherein in the case of multiple dual tires, all the tire modules of the tires on the outside of the vehicle on one vehicle side are firstly identified and associated; and, wherein subsequently the tire modules of the tires on the inside of the vehicle on the same vehicle side are identified and associated.

8. A method for associating tire positions on a vehicle having a tire pressure monitoring system, the method comprising the steps of:
   a) inputting vehicle data and vehicle tire information with a mobile detecting device;
   b) analyzing the inputted information with the mobile detecting device;
   c) providing an instruction to a user of the mobile detecting device, wherein the instruction indicates to the user a first vehicle tire for the execution of a first tire module identification;
   d) positioning the mobile detecting device in the vicinity of the first vehicle tire, the vehicle tire being predefined by the mobile detecting device;
   e) activating an interrogation signal with a transmission frequency specified by the mobile detecting device and with a specified signal amplitude to a tire module arranged in the vehicle tire, the tire module having at least one sensor configured to monitor the tire pressure;
   f) detecting a response signal from the tire module, wherein the response signal includes at least the identification data of the tire module;

g) evaluating the response signal of the tire module and associating the identified tire module with a tire position on the vehicle;

h) storing the association of the identified tire module in a memory of the mobile detecting device;

i) displaying a further instruction to the user of the mobile detecting device, wherein the further instruction indicates to the user the next vehicle tire for the execution of a next tire module identification;

j) positioning the mobile detecting device in the vicinity of the next vehicle tire for the execution of a next tire module identification;

k) repetition of the steps e) to j) until all the tire modules have been identified and respectively associated with a tire position on the vehicle;

l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and, wherein in step f), the tire modules which have already been sensed and identified are ignored by the detecting device if further response signals are received from these tire modules by the detecting device.

9. A method for associating tire positions on a vehicle having a tire pressure monitoring system, the method comprising the steps of:

a) inputting vehicle data and vehicle tire information with a mobile detecting device;

b) analyzing the inputted information with the mobile detecting device;

c) providing an instruction to a user of the mobile detecting device, wherein the instruction indicates to the user a first vehicle tire for the execution of a first tire module identification;

d) positioning the mobile detecting device in the vicinity of the first vehicle tire, the vehicle tire being predefined by the mobile detecting device;

e) activating an interrogation signal with a transmission frequency specified by the mobile detecting device and with a specified signal amplitude to a tire module arranged in the vehicle tire, the tire module having at least one sensor configured to monitor the tire pressure;

f) detecting a response signal from the tire module, wherein the response signal includes at least the identification data of the tire module;

g) evaluating the response signal of the tire module and associating the identified tire module with a tire position on the vehicle;

h) storing the association of the identified tire module in a memory of the mobile detecting device;

i) displaying a further instruction to the user of the mobile detecting device, wherein the further instruction indicates to the user the next vehicle tire for the execution of a next tire module identification;

j) positioning the mobile detecting device in the vicinity of the next vehicle tire for the execution of a next tire module identification;

k) repetition of the steps e) to j) until all the tire modules have been identified and respectively associated with a tire position on the vehicle;

l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and, wherein in step g), double checking of the response signals takes place, wherein the identification data of the tire module are not accepted by the detecting device as being correct until the same identification data are received at least twice in succession in a short time interval by the detecting device.

10. A method for associating tire positions on a vehicle having a tire pressure monitoring system, the method comprising the steps of:

a) inputting vehicle data and vehicle tire information with a mobile detecting device;

b) analyzing the inputted information with the mobile detecting device;

c) providing an instruction to a user of the mobile detecting device, wherein the instruction indicates to the user a first vehicle tire for the execution of a first tire module identification;

d) positioning the mobile detecting device in the vicinity of the first vehicle tire, the vehicle tire being predefined by the mobile detecting device;

e) activating an interrogation signal with a transmission frequency specified by the mobile detecting device and with a specified signal amplitude to a tire module arranged in the vehicle tire, the tire module having at least one sensor configured to monitor the tire pressure;

f) detecting a response signal from the tire module, wherein the response signal includes at least the identification data of the tire module;

g) evaluating the response signal of the tire module and associating the identified tire module with a tire position on the vehicle;

h) storing the association of the identified tire module in a memory of the mobile detecting device;

i) displaying a further instruction to the user of the mobile detecting device, wherein the further instruction indicates to the user the next vehicle tire for the execution of a next tire module identification;

j) positioning the mobile detecting device in the vicinity of the next vehicle tire for the execution of a next tire module identification;

k) repetition of the steps e) to j) until all the tire modules have been identified and respectively associated with a tire position on the vehicle;

l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and, wherein in step g), checking takes place as to whether a received data telegram is a response signal and not a periodically outputted signal of the tire module.

11. A method for associating tire positions on a vehicle having a tire pressure monitoring system, the method comprising the steps of:

a) inputting vehicle data and vehicle tire information with a mobile detecting device;

b) analyzing the inputted information with the mobile detecting device;

c) providing an instruction to a user of the mobile detecting device, wherein the instruction indicates to the user a first vehicle tire for the execution of a first tire module identification;
d) positioning the mobile detecting device in the vicinity of the first vehicle tire, the vehicle tire being predefined by the mobile detecting device;
e) activating an interrogation signal with a transmission frequency specified by the mobile detecting device and with a specified signal amplitude to a tire module arranged in the vehicle tire, the tire module having at least one sensor configured to monitor the tire pressure;
f) detecting a response signal from the tire module, wherein the response signal includes at least the identification data of the tire module;
g) evaluating the response signal of the tire module and associating the identified tire module with a tire position on the vehicle;
h) storing the association of the identified tire module in a memory of the mobile detecting device;
i) displaying a further instruction to the user of the mobile detecting device, wherein the further instruction indicates to the user the next vehicle tire for the execution of a next tire module identification;
j) positioning the mobile detecting device in the vicinity of the next vehicle tire for the execution of a next tire module identification;
k) repetition of the steps e) to j) until all the tire modules have been identified and respectively associated with a tire position on the vehicle;
l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and,
wherein in step g), checking takes place as to whether the tire module is in a deactivated state, wherein subsequently in the case of identification of deactivation, the tire module is automatically placed in an active state.

12. A method for associating tire positions on a vehicle having a tire pressure monitoring system, the method comprising the steps of:
a) inputting vehicle data and vehicle tire information with a mobile detecting device;
b) analyzing the inputted information with the mobile detecting device;
c) providing an instruction to a user of the mobile detecting device, wherein the instruction indicates to the user a first vehicle tire for the execution of a first tire module identification;
d) positioning the mobile detecting device in the vicinity of the first vehicle tire, the vehicle tire being predefined by the mobile detecting device;
e) activating an interrogation signal with a transmission frequency specified by the mobile detecting device and with a specified signal amplitude to a tire module arranged in the vehicle tire, the tire module having at least one sensor configured to monitor the tire pressure;
f) detecting a response signal from the tire module, wherein the response signal includes at least the identification data of the tire module;
g) evaluating the response signal of the tire module and associating the identified tire module with a tire position on the vehicle;
h) storing the association of the identified tire module in a memory of the mobile detecting device;
i) displaying a further instruction to the user of the mobile detecting device, wherein the further instruction indicates to the user the next vehicle tire for the execution of a next tire module identification;
j) positioning the mobile detecting device in the vicinity of the next vehicle tire for the execution of a next tire module identification;
k) repetition of the steps e) to j) until all the tire modules have been identified and respectively associated with a tire position on the vehicle;
l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and,
wherein a detecting mode of the mobile detecting device is interrupted if in at least two measurements two response telegrams are received in direct succession from different tire modules and no unambiguous tire position association can take place.

13. A method for associating tire positions on a vehicle having a tire pressure monitoring system, the method comprising the steps of:
a) inputting vehicle data and vehicle tire information with a mobile detecting device;
b) analyzing the inputted information with the mobile detecting device;
c) providing an instruction to a user of the mobile detecting device, wherein the instruction indicates to the user a first vehicle tire for the execution of a first tire module identification;
d) positioning the mobile detecting device in the vicinity of the first vehicle tire, the vehicle tire being predefined by the mobile detecting device;
e) activating an interrogation signal with a transmission frequency specified by the mobile detecting device and with a specified signal amplitude to a tire module arranged in the vehicle tire, the tire module having at least one sensor configured to monitor the tire pressure;
f) detecting a response signal from the tire module, wherein the response signal includes at least the identification data of the tire module;
g) evaluating the response signal of the tire module and associating the identified tire module with a tire position on the vehicle;
h) storing the association of the identified tire module in a memory of the mobile detecting device;
i) displaying a further instruction to the user of the mobile detecting device, wherein the further instruction indicates to the user the next vehicle tire for the execution of a next tire module identification;
j) positioning the mobile detecting device in the vicinity of the next vehicle tire for the execution of a next tire module identification;
k) repetition of the steps e) to j) until all the tire modules have been identified and respectively associated with a tire position on the vehicle;
l) transmitting the data detected and evaluated with the mobile detecting device to a central unit of the tire pressure monitoring system on the vehicle, wherein the tire pressure monitoring system associates a tire module identification to each tire position on the vehicle, as a result of which, in the event of a tire pressure warning message, the respective tire position on the vehicle can be indicated to the driver; and, wherein the user is instructed to drive the vehicle approximately one meter further and to repeat the measurement with the detecting device on the last vehicle tire, if no unambiguous tire position association can take place despite repeated measurement with the detecting device.

* * * * *